(12) United States Patent
Fraser et al.

(10) Patent No.: US 8,264,501 B2
(45) Date of Patent: Sep. 11, 2012

(54) SYSTEM AND METHOD FOR RADIAL COMPONENT SCATTERING

(75) Inventors: Adrian Fraser, Cambridge (GB); Philip O. Williams, Huntsville, AL (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 860 days.

(21) Appl. No.: 12/051,029

(22) Filed: Mar. 19, 2008

(65) Prior Publication Data

US 2008/0291200 A1 Nov. 27, 2008

Related U.S. Application Data

(60) Provisional application No. 60/896,665, filed on Mar. 23, 2007.

(51) Int. Cl.
*G09G 5/00* (2006.01)
(52) U.S. Cl. .................................................. 345/619
(58) Field of Classification Search .................. 345/420
See application file for complete search history.

(56) References Cited

U.S. PATENT DOCUMENTS

| | | | | |
|---|---|---|---|---|
| 5,428,726 A | * | 6/1995 | Piegl et al. | 345/441 |
| 6,844,877 B1 | * | 1/2005 | Rajkumar et al. | 345/420 |
| 6,933,994 B1 | * | 8/2005 | Kaneko et al. | 349/112 |
| 2006/0221022 A1 | * | 10/2006 | Hajjar | 345/84 |

* cited by examiner

*Primary Examiner* — Said Broome
*Assistant Examiner* — Janice Kau

(57) ABSTRACT

A system, method, and computer program for radial component scattering, comprising calculating a bounding box for each of a plurality of parts; calculating a centroid corresponding to each of said bounding boxes; calculating a scatter circle for placement of said plurality of parts; calculating a number of locations to place said plurality of parts on said scatter circle; whereby said plurality of parts are added to an assembly view in a single operation such that a largest of said plurality of parts is at a start point, and appropriate means and computer-readable instructions.

18 Claims, 11 Drawing Sheets

| Assembly | Qty | Diameter |
|---|---|---|
| s1 | 6 | 100 |
| s2 | 6 | 60 |

SYSTEM AND METHOD FOR RADIAL COMPONENT SCATTERING

CROSS-REFERENCE TO RELATED APPLICATIONS

This Application claims priority to pending Provisional U.S. Application Ser. No. 60/896,665, filed on Mar. 23, 2007, which application is incorporated herein by reference in its entirety. This application is related to U.S. Ser. No. 12/051,021, entitled "SYSTEM AND METHOD FOR COMPONENT SCATTERING" and U.S. Ser. No. 12/051,039, entitled "SYSTEM AND METHOD COMPONENT SCATTERING FROM A LIST", filed on Mar. 19, 2008 (even date herewith), which applications are incorporated by reference here.

TECHNICAL FIELD

The presently preferred embodiment of the innovations described herein relate generally to software applications. More specifically, the presently preferred embodiment relates to scattering components into a modeling assembly.

BACKGROUND

Common in the industry of computer aided drafting is the need for a user, or drafter, or designer, to place multiple objects close to a center. The placement of the multiple objects aides the designer when combining parts and sub-parts to form a larger assembly comprised of multiple components. The modeling of any assembly involves specifying all of its constituent parts and then adding them into the assembly. Traditionally, this process is typically done by specifying one part at a time and positioning the part into the assembly. The positioning can be time consuming and inefficient when a large number of parts are involved or if there are many instances of the same part that are members of the assembly. Alternatively, the addition of multiple parts may result in overlapping placement or illogical placement that could occur anywhere within the limits of the 3D modeling environment. Additionally, it is important that these parts don't overlap each other in the assembly space.

It is desirable to improve user experience and efficiency with logical and intuitive placement of parts in an assembly; adding multiple parts to the assembly in a single operation with efficiency and less effort can significantly reduce the time to model the assembly. What is needed is a system and method for adding multiple parts in an assembly in a single operation that overcomes the limitations of the known methods discussed above.

SUMMARY

To achieve the foregoing, and in accordance with the purpose of the presently preferred embodiment as described herein, the present application provides a computer implemented method for radial component scattering, comprising calculating a bounding box for each of a plurality of parts; calculating a centroid corresponding to each of said bounding boxes; calculating a scatter circle for placement of said plurality of parts; calculating a number of locations to place said plurality of parts on said scatter circle; whereby said plurality of parts are added to an assembly view in a single operation such that a largest of said plurality of parts is at a start point. The method, wherein said scatter circle is calculated from a sum of a maximum forward offset and a maximum backward offset. The method, wherein said number of locations is determined by a length calculated from a bounding box radius. The method, wherein said length is a chord length. The method, wherein said number of locations is determined by dividing 360 degrees by an angle subtended from a center position by a chord length that is a value times a maximum bounding box radius. The method, wherein said value is two.

An advantage of the presently preferred embodiment is to provide a computer-program product tangibly embodied in a machine readable medium to perform a method for component scattering, comprising instructions operable to cause a computer to calculating a bounding box for each of a plurality of parts; calculating a centroid corresponding to each of said bounding boxes; calculating a scatter circle for placement of said plurality of parts; calculating a number of locations to place said plurality of parts on said scatter circle; whereby said plurality of parts are added to an assembly view in a single operation such that a largest of said plurality of parts is at a start point. The computer-program product, wherein said scatter circle is calculated from a sum of a maximum forward offset and a maximum backward offset. The computer-program product, wherein said number of locations is determined by a length calculated from a bounding box radius. The computer-program product, wherein said length is a chord length. The computer-program product, wherein said number of locations is determined by dividing 360 degrees by an angle subtended from a center position by a chord length that is a value times a maximum bounding box radius. The computer-program product, wherein said value is two.

And another advantage of the presently preferred embodiment is to provide a data processing system having at least a processor and accessible memory to implement a method for component scattering, comprising means for calculating a bounding box for each of a plurality of parts; means for calculating a centroid corresponding to each of said bounding boxes; means for calculating a scatter circle for placement of said plurality of parts; means for calculating a number of locations to place said plurality of parts on said scatter circle.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Computer System

Figure 8:
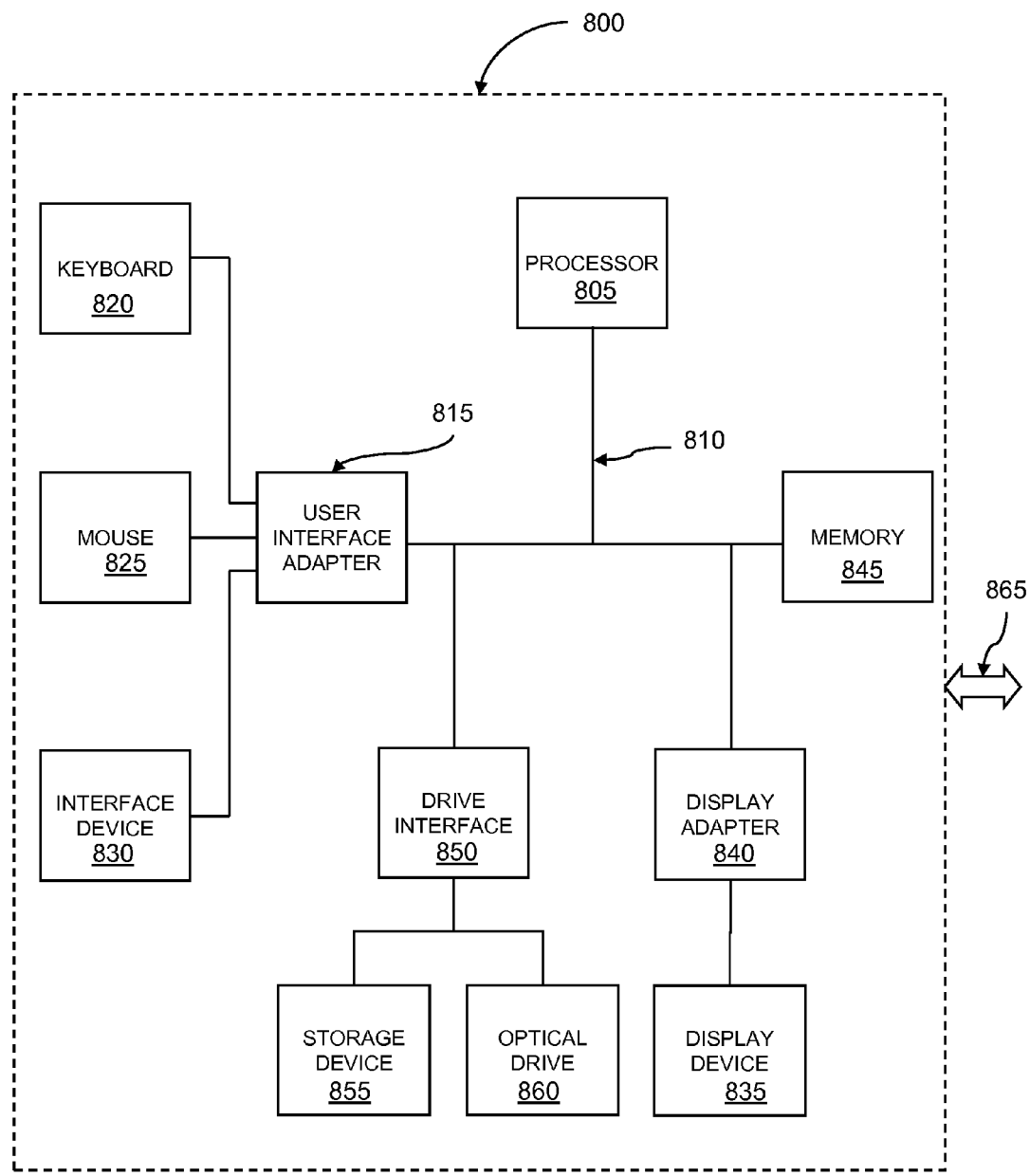
FIG. 8 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for radial component scattering. Now therefore, in accordance with the presently preferred embodiment, an operating system executes on a computer, such as a general-purpose personal computer. FIG. 8 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 8, an exemplary system for implementing the presently preferred embodiment includes a general-purpose computing device in the form of a computer 800, such as a desktop or laptop computer, including a plurality of related peripheral devices (not depicted). The computer 800 includes a microprocessor 805 and a bus 810 employed to connect and enable communication between the microprocessor 805 and a plurality of components of the computer 800 in accordance with known techniques. The bus 810 may be any of several types of bus structures including a memory bus or memory controller, a peripheral bus, and a local bus using any of a variety of bus architectures. The computer 800 typically includes a user interface adapter 815, which connects the microprocessor 805 via the bus 810 to one or more interface devices, such as a keyboard 820, mouse 825, and/or other interface devices 830, which can be any user interface device, such as a touch sensitive screen, digitized pen entry pad, etc. The bus 810 also connects a display device 835, such as an LCD screen or monitor, to the microprocessor 805 via a display adapter 840. The bus 810 also connects the microprocessor 805 to a memory 845, which can include ROM, RAM, etc.

The computer 800 further includes a drive interface 850 that couples at least one storage device 855 and/or at least one optical drive 860 to the bus. The storage device 855 can include a hard disk drive, not shown, for reading and writing to a disk, a magnetic disk drive, not shown, for reading from or writing to a removable magnetic disk drive. Likewise the optical drive 860 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 800.

The computer 800 can communicate via a communications channel 865 with other computers or networks of computers. The computer 800 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 845 of the computer 800. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System for Component Scattering

Figure 1:
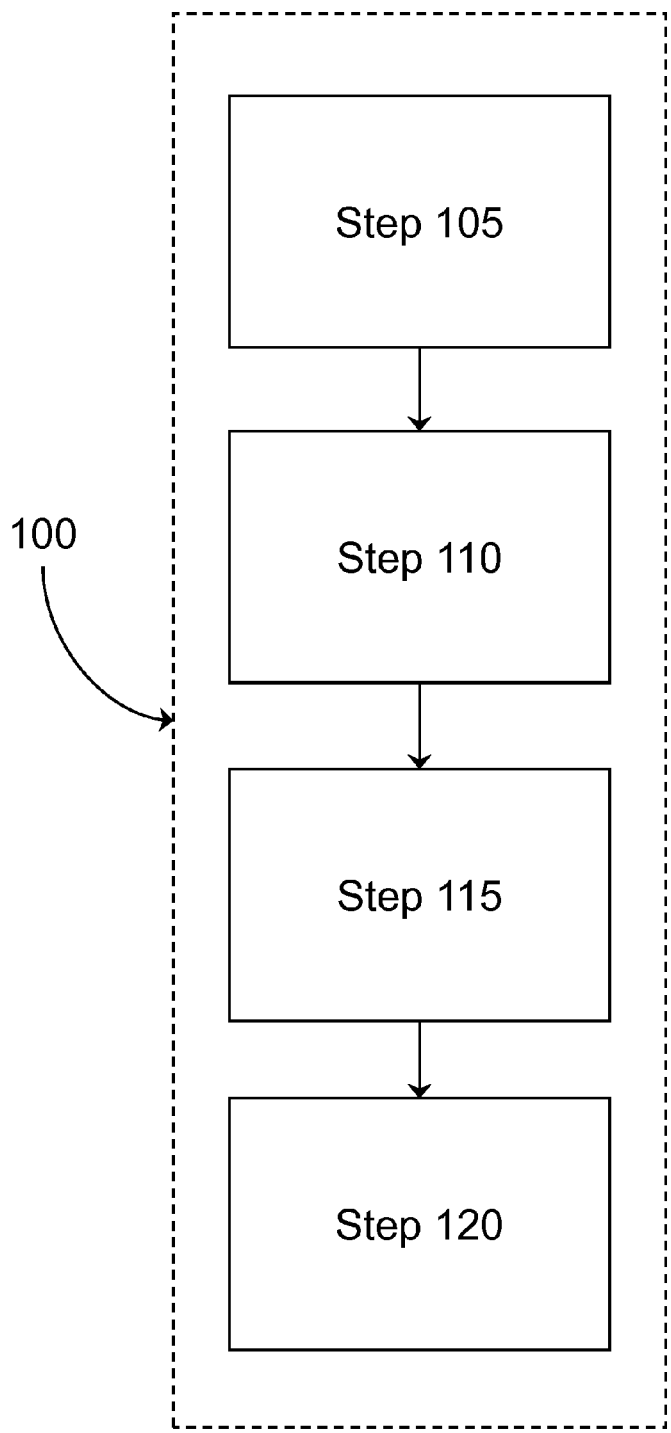
FIG. 1 is a logic flow diagram of the method employed by the presently preferred embodiment.

FIG. 1 is a logic flow diagram of the method employed by the presently preferred embodiment. Referring to FIG. 1, a computer implemented method 100 determines radial component scatter. Having selected the number of parts to add to a viewable display, the bounding box for each of the parts is calculated (Step 105). Next, a centroid corresponding to each of the bounding boxes is calculated (Step 110). A plurality of scatter circles for placement of the parts is calculated from the sum of a maximum forward offset and a maximum backward offset (Step 115). Lastly, a number of locations to place the numerous parts are calculated on the scatter circles (Step 120) so that the parts can be added to an assembly view in a single operation with the largest of the parts placed at a start point. The methods of radial component scattering in accordance with the presently preferred embodiment are set forth in more detail below.

Step 1

Figure 2:
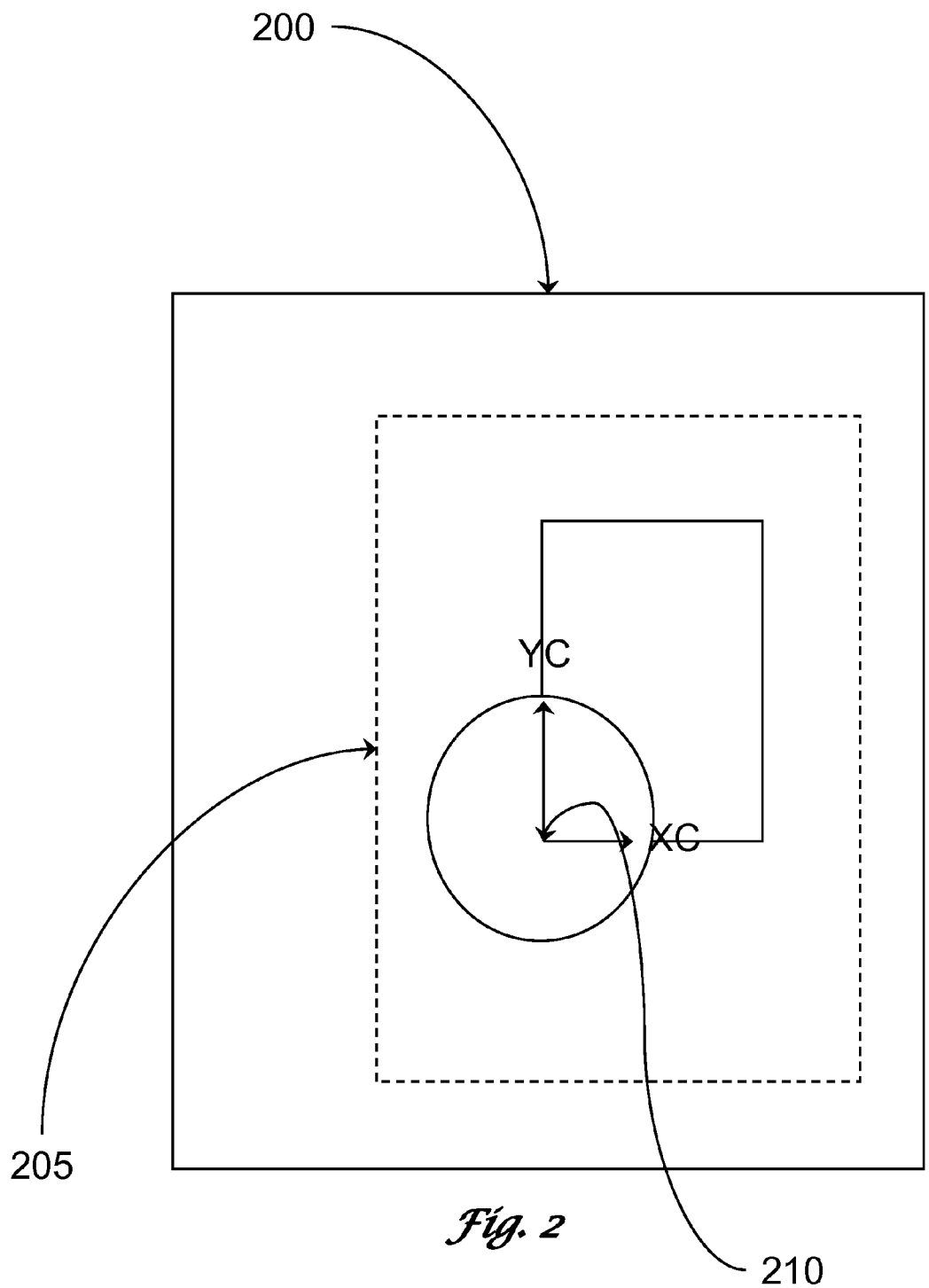
FIG. 2 is an illustration of a windowed environment.

FIG. 2 is an illustration of a windowed environment. Referring to FIG. 2, a user places in a windowed environment 200 a number of geometric objects 205 by known means such as creating the geometric objects 205 or loading the geometric objects 205 from an already existing source. The user can select and set an orientation of geometric objects 205 to a component axis 210. The component axis 210, orients and positions the geometric objects 205 on a plane, for example in this illustration XC-YC, where the "C" refers to Component, but the user could have selected the orientation along the x-z plane or the y-z plane. Likewise, the user could have selected to orient the geometric objects 205 to an absolute coordinate on the X-Y-Z axis. The user then selects a scatter position center as either absolute origin according to the graphic display or it may be arbitrarily determined by the user or other method such that a sufficient determination for the scatter position center is identified.

Step 2

Figure 3:
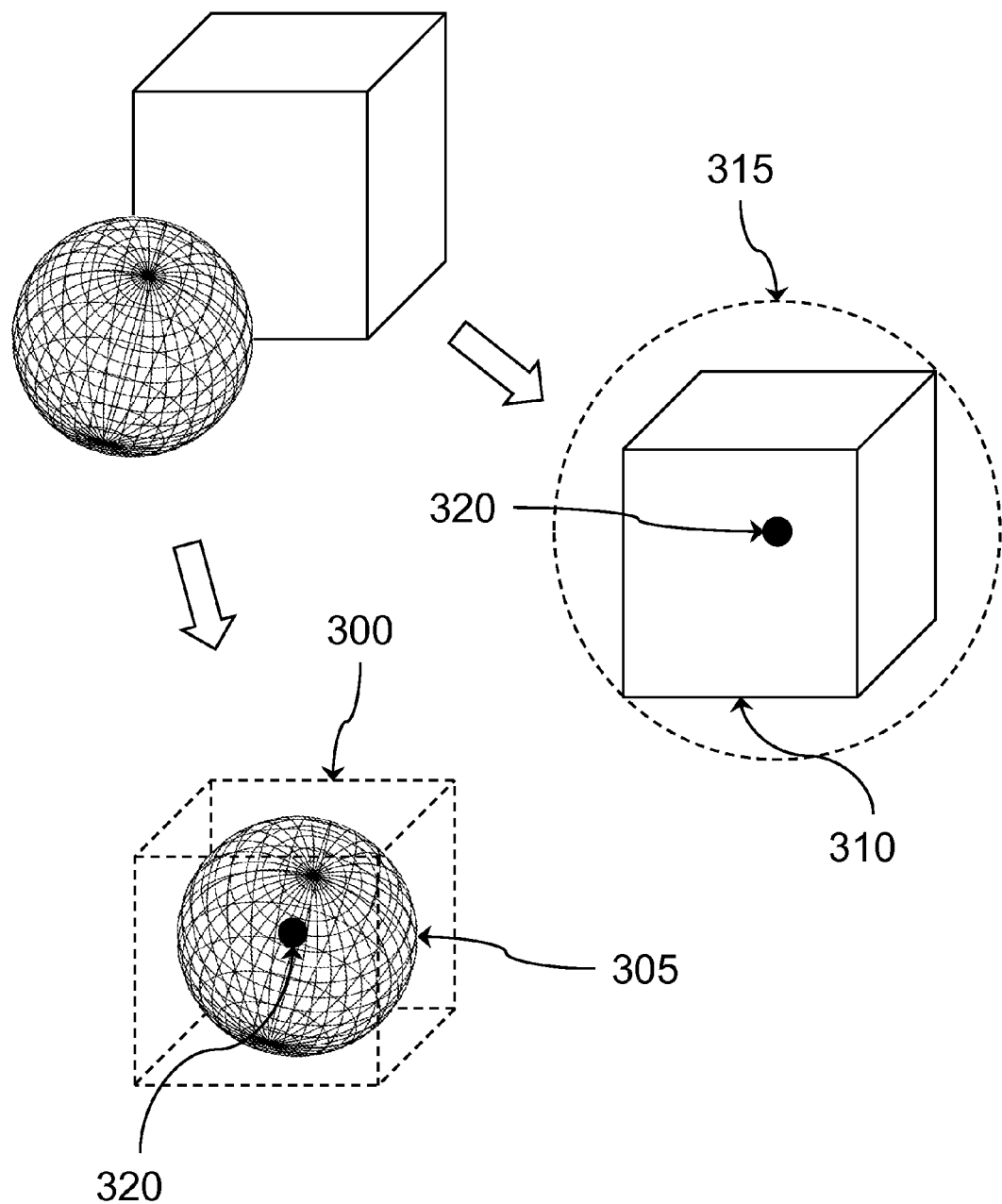
FIG. 3 is an illustration of a geometric object with a bounding box.

FIG. 3 is an illustration of a geometric object with a bounding box. Referring to FIG. 3, a bounding box 300 is calculated for a sphere 305. For a cube 310, a bounding box radius 315 is determined based upon the length of an internal diagonal. Once the bounding box is calculated, a centroid 320 is also determined where the centroid 320 is the weighted center of the cube and circle, respectively. It is understood that the number of geometric objects 205 can have a common bounding box, and a common centroid.

Step 3

Figure 4:
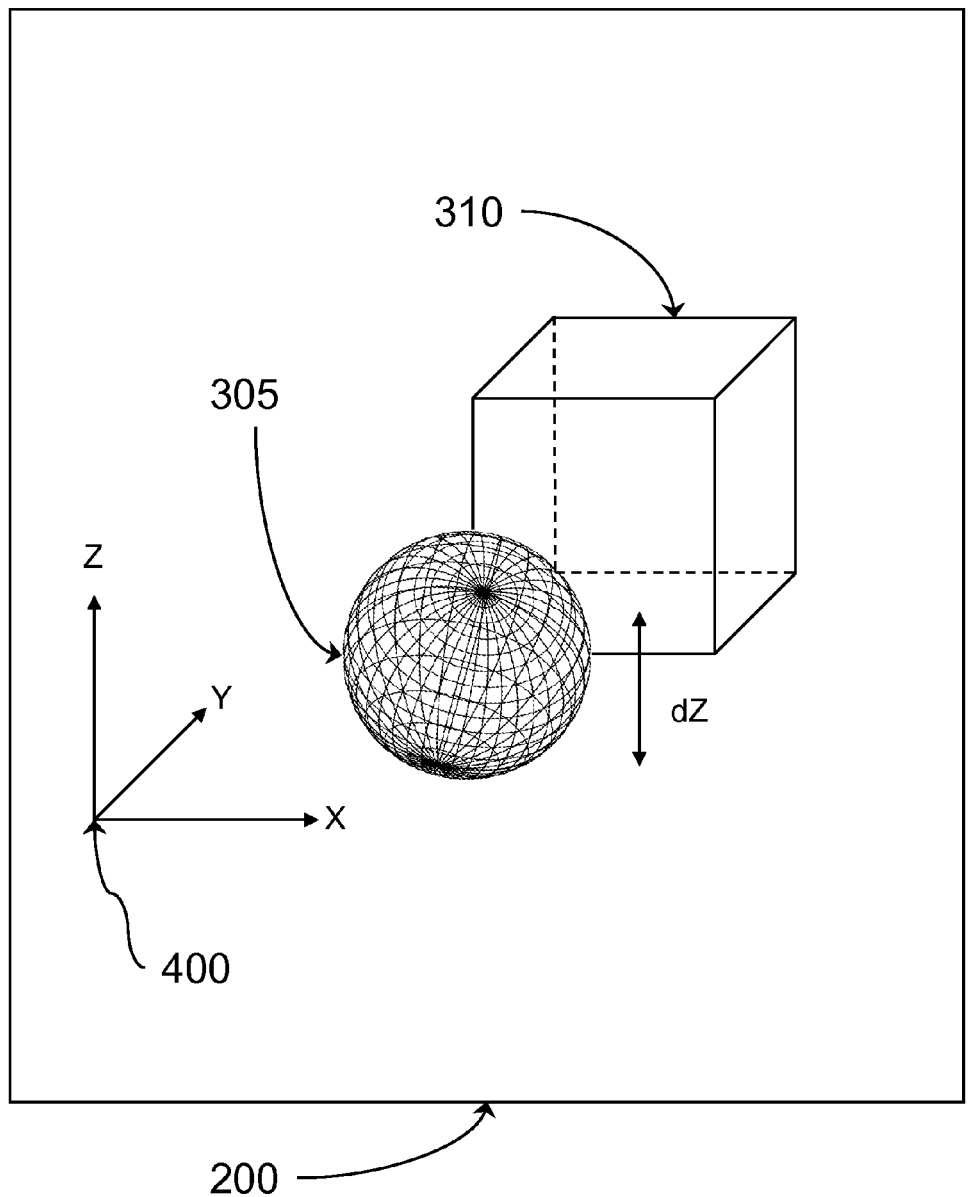
FIG. 4 is an illustration of a windowed environment.

In a presently preferred embodiment, to orient the geometric objects 205 in the windowed environment 200, it is preferred to orient all objects for placement along a common axis or plane, for example, the Z plane. FIG. 4 is an illustration of a windowed environment. Referring to FIG. 4, a Z-coordinate position of the current instance for the cube 310 is positioned relative to an absolute coordinate 400 to ensure the bottom of all placed instances lay at the same z-plane according to the following equation:

Z=Scatter Center's Z coordinate−extent of component in Z direction (dZ)

Step 4

Figure 5:
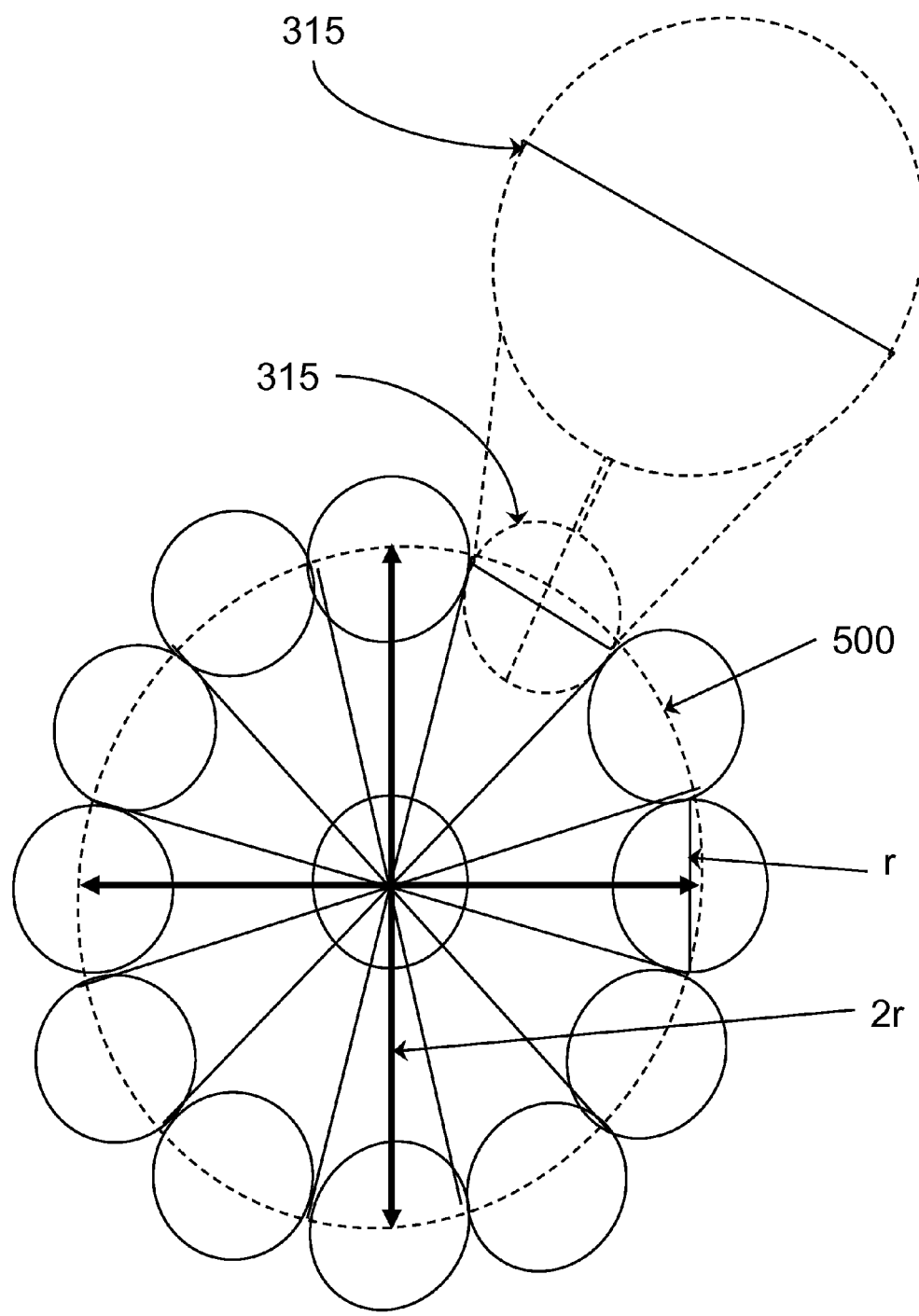
FIG. 5 is an illustration of a first scatter circle.
Figure 6:
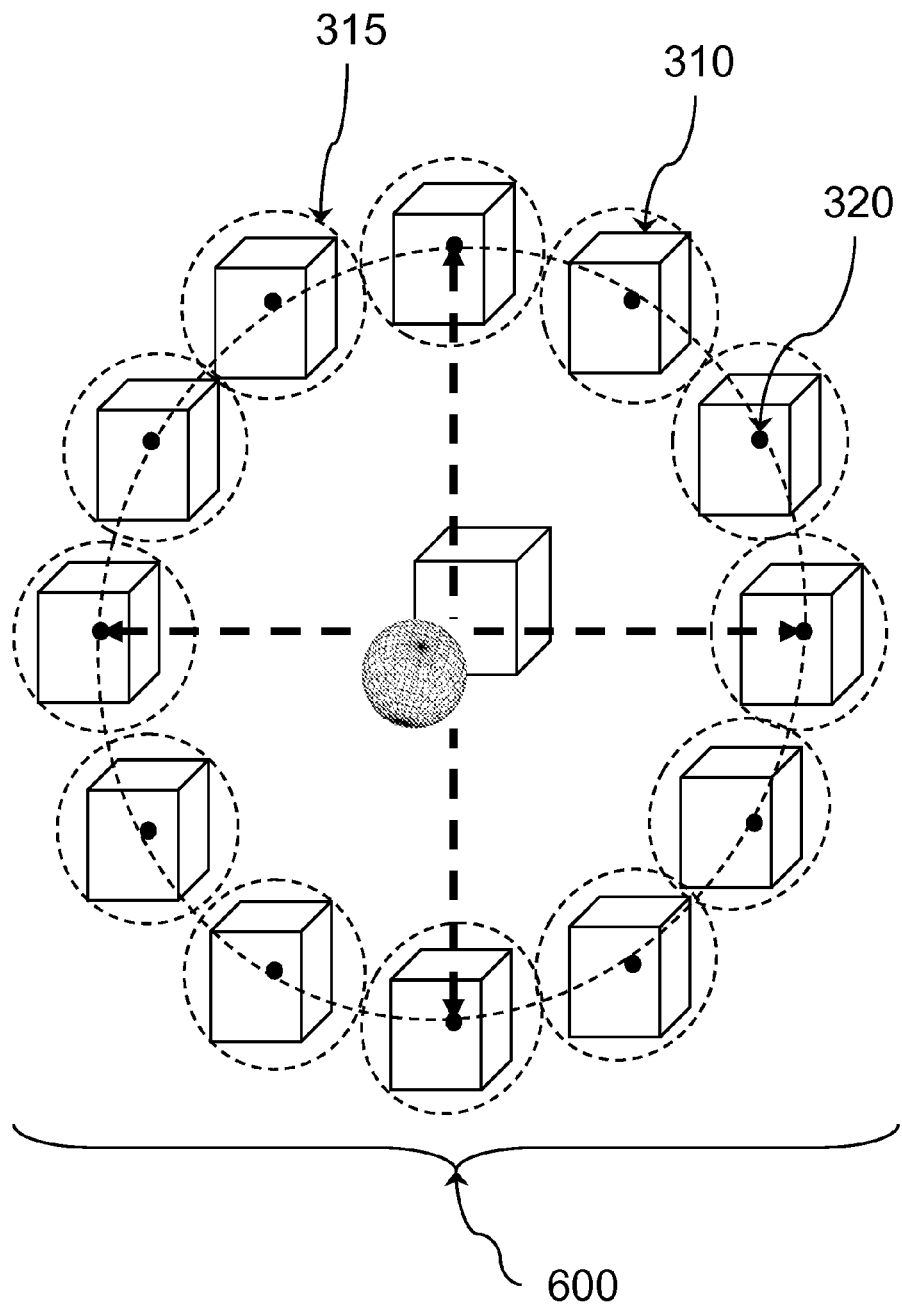
FIG. 6 illustrates a scatter result.

At the outset, the part with the greatest volume is situated at the scatter center position that is the component axis 210. The remaining parts or instances of the same center-placed part are then placed around a first circle having a first circle radius equal to twice the size of a maximum bounding box radius. FIG. 5 is an illustration of a first scatter circle. Referring to FIG. 5, the number of instances that are placed along a first scatter circle 500 depends upon the maximum bounding box radius 315 for the largest volume object. In the presently preferred embodiment, to calculate the number of parts use the following equation:

Parts per circle=360°/(angle subtended at scatter center position by chord length equal to 2× the maximum bounding box radius)

where the maximum bounding box radius is determined from the remaining instances/parts to be scattered. From FIG. 5, the subtended angle is 30° because of the nature of the 30-60-90 triangle that results in (360°/30°=) 12 parts placed for this first scatter circle 500 along the circumference. With parts and instances of those parts placed radially around the scatter center position. Once the radius of the first scatter circle 500 is determined as twice the maximum bounding box radius and the number of instances to be placed along the first scatter circle 500 circumference, the position of the part/instance is determined according to: X=(r)cos θ and Y=(r)sin θ, such that the centroid of the position is located at (x,y). FIG. 6 illustrates a scatter result. Referring to FIG. 6, a scatter result 600 is shown for the placement of 12 cubes to the drawing in the windowed environment Step 5

To place additional instances and/or new parts in the windowed environment 200, a new scatter circle is calculated using the formula:

radius=radius of prior circle+MFO+MBO,

Where MFO=centroid of the instance in the X-direction+the maximum bounding box radius of the instance/part already placed, and MBO=centroid of the instance in the x-direction in the next circle for instances/parts that are still be placed+the maximum bounding box radius of the instance/part to be placed.

EXAMPLE

Figure 7:
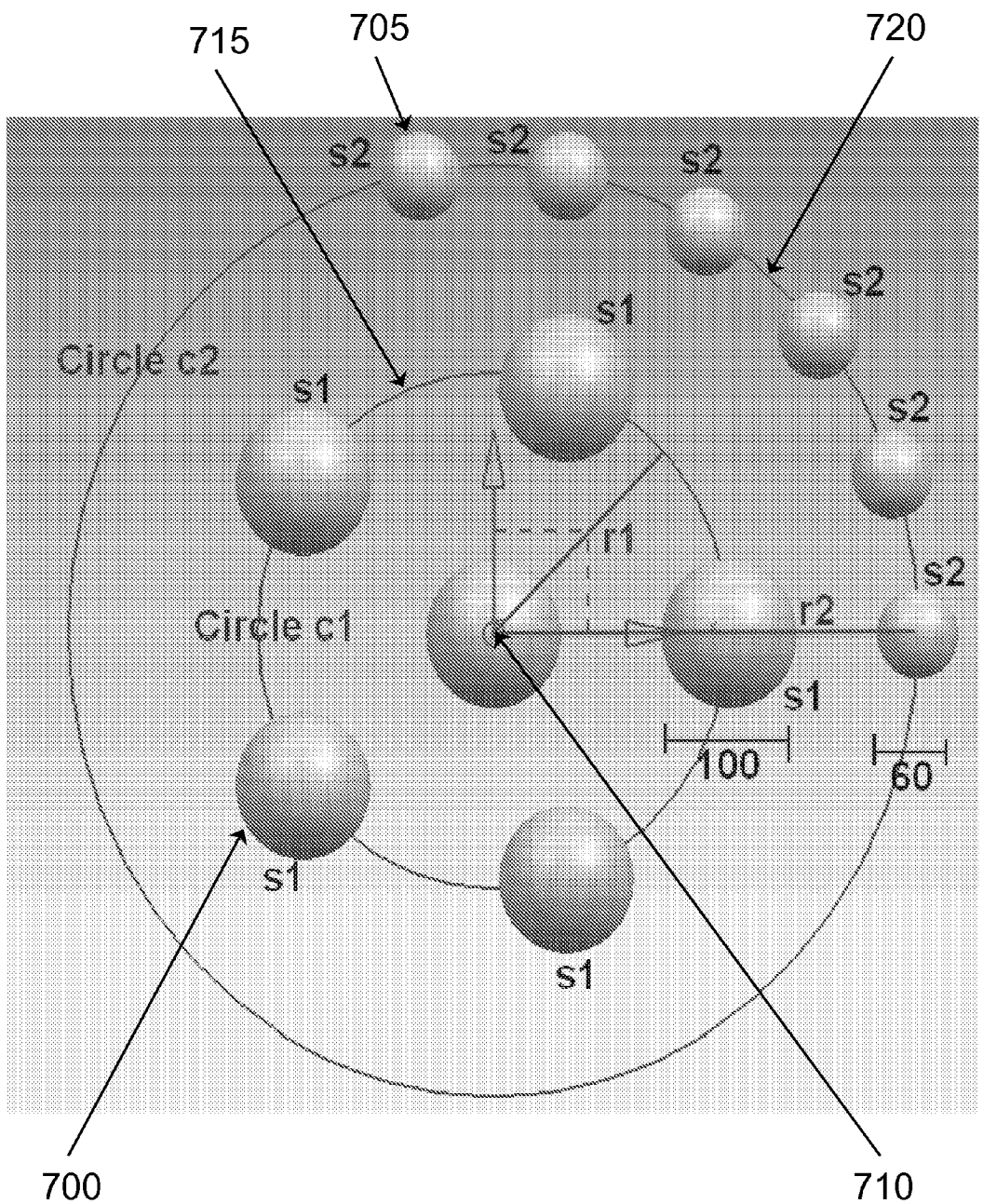
FIG. 7 illustrates a component addition according to the presently preferred embodiment.

FIG. 7 illustrates a component addition according to the presently preferred embodiment. Referring to FIG. 7, the user intends to add 6 instances of a first sphere, s1 700, and 6 instances of a second sphere, s2 705, having diameters 100 and 60 respectively. A bounding box radius of s1 700 is ~86.6, and a bounding box radius of sphere s2 705 is ~51.9. Assuming the user chose the absolute origin as a scatter center 710 that point is (0,0,0). The first component is placed with its centroid at 0,0,0. The forward off set for this component is centroid_in_X_dir[thispart]+boxRadius[thispart], which equals 86.6 (0+86.6) in this example. Because there is only one component that can be placed at the scatter center 710 move to next circle, c1 715. The radius of c1 715 is calculated considering the maximum forward offset in previous circle (in this case its bounding box radius (86.6) of the sphere placed at (0,0,0) and the maximum backward offset possible in c1 715 so that no component placed in c1 715 overlaps with component placed at 0,0,0. In this case the bounding box radius of s1 700 is ~86.6. The centroid is also considered while calculating the backward offset. The backward offset is calculated for all the parts/instances that are still to be placed and the maximum of these values is considered the backward offset. The radius of c1 is Maximum forward offset+Maximum backward offset, which equals 173.2 (86.6+86.6) in this example. The number of components that can be placed on c1 715 is determined by the equation equal to 360 degrees divided by the angle subtended at the circle origin by the two ends of a line having length equal to twice the bounding box radius of the first part to be added on the circle, which is in this example. Once all the 5 components are placed on this circle c1 715. Next, move to the next circle, c2 720 to place the remaining instances. The radius of c2 720 equals the radius of c1+maximum forward offset on c1+maximum possible backward offset on c2, which is 311.76 (=173.2+86.6+51.96) in this example. The number of components that can be placed on c2 720 equals 360 deg divided by the angle subtended at the circle origin by two ends of a line having length equal to twice the bounding box radius of the first part to be added on the circle, which is 18 in this example. Because only 6 more components need be placed, the remaining 12 places are empty.

Figure 12:
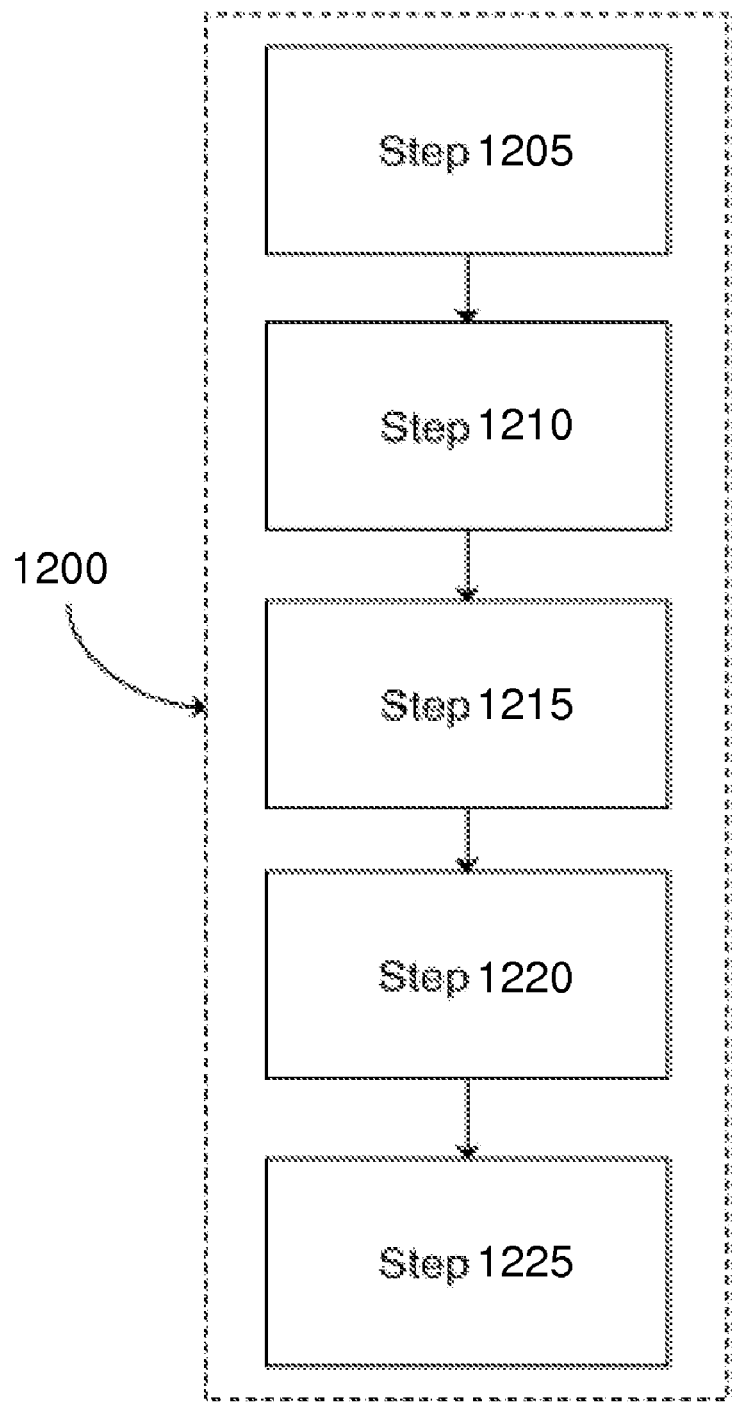
FIG. 12 is a logic flow diagram of the method employed by an embodiment.

FIG. 12 is a logic flow diagram of the method employed by another embodiment. Referring to FIG. 12, a computer implemented method 1200 determines a component scattering from a bill of material. Begin by selecting a plurality of parts from a bill of material (Step 1205. Continuing, calculate a bounding box for each of said plurality of parts (Step 1210). Then, calculate a centroid corresponding to each of said bounding boxes (Step 1215). Next, calculate a scatter circle for placement of said plurality of parts on a same plane determined from a number of offsets (Step 1220). Finally, calculate a number of locations to place said plurality of parts on said scatter circle so that said plurality of parts are added to an assembly view in a single operation such that a largest of said plurality of parts is at a start point. The methods of component scattering from a hierarchical list in accordance with the presently preferred embodiment are set forth in more detail below.

Figures 9, 10:
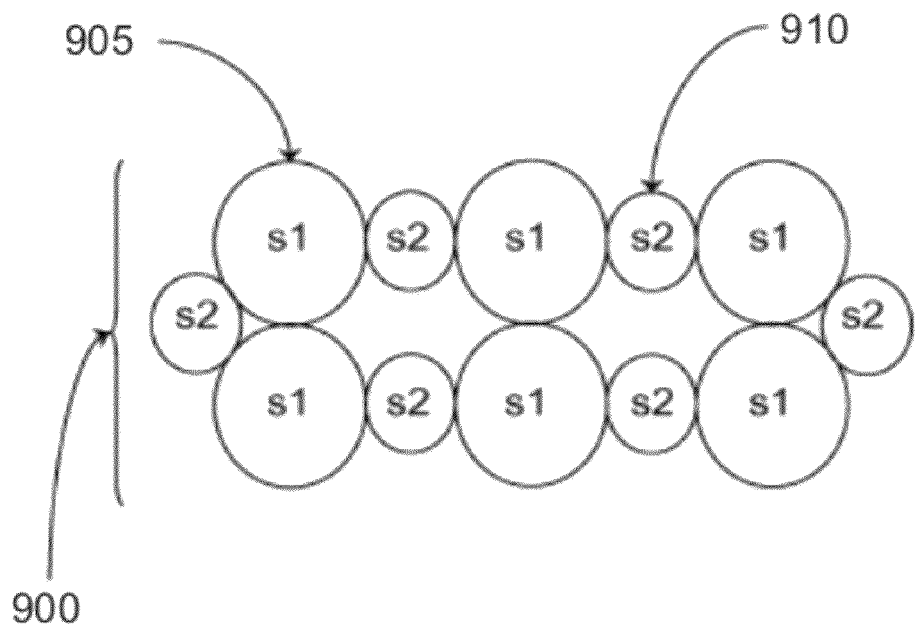
FIG. 9 illustrates an intended model for a new product design.
FIG. 10 illustrates a bill of material for a new product design.

FIG. 9 illustrates an intended model for a new product design. Referring to FIG. 9, a new product design 900 is designed to comprise two sub-components, a large sphere, s1 905, and a small sphere, s2 910. The new product design 900 is designed to have 6 of each type of sphere, 905 and 910, respectively. FIG. 10 illustrates a bill of material for a new product design. Referring to FIG. 10, the new product design 900 is represented in a bill of material (BOM) 1000, or may alternatively be represented by any structured list that may or may not have a hierarchy. Located within the BOM 1000 are property values specific to the parts that comprise the new product design 900. For example, the BOM 1000 lists each part by a name, lists the quantity of each named part, and lists the diameter of each named part.

Figure 11:
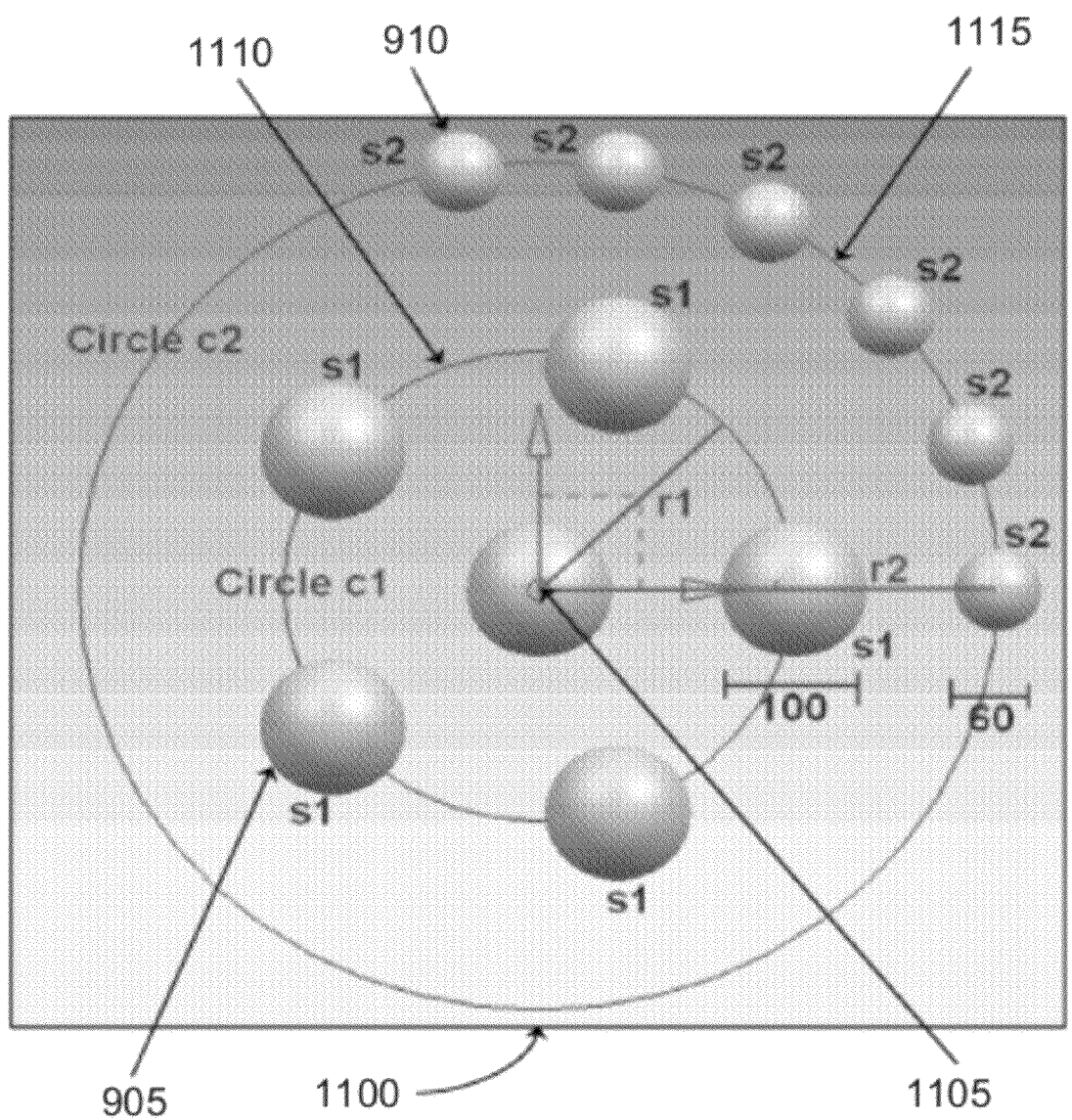
FIG. 11 depicts the placement of BOM items in a windowed environment.

During new product design, often times designers understand a high-level view of what main components comprise the new product design and create a listing of those components. That listing may be in the form of a bill of material or other logically ordered list. In the process of creating the logically ordered list of components, the designers may desire to build a new product design out of known components, in a hierarchical bill of material view. Moving now from the conceptual stage to a design stage, those designers intend to place their new product design into a computer aided drafting (CAD) application. In the CAD application the new product design is placed and manipulated; otherwise further refining the new product design. It is useful to the designers to have the ability to place components of the new product design in a manner that is logical and intuitive. The logical and intuitive manner of component (or part) placement is illustrated in FIG. 11 that depicts the placement of BOM items in a windowed environment. Referring to FIG. 11, the BOM 915 is input to an application that places the s1 905 and s2 910 components in a windowed environment 1100. The user has selected to orient the new product design 900 at an absolute center 1105 (0,0,0). Given the information contained in the BOM 915, s1 905 and s2 910 have diameters 100 and 60 respectively. A bounding box radius of 905 is ~86.6, and a bounding box radius of sphere s2 910 is ~51.9. The first instance of s1 905 is placed with its centroid at the absolute center 1105. The forward offset for first instance of s1 905 is centroid_in_X_dir[ thispart]+ boxRadius[ thispart], which equals 86.6 (=0+86.6) in this example. Because, there is only one component that can be placed at the absolute center 1105, a scatter circle, c1 1110, is calculated. The radius of c1 1110 is calculated considering the maximum forward offset in previous circle (in this case its bounding box radius(86.6) of s1 905 placed at the absolute center 1105 and the maximum backward offset possible in c1 1110 so that no component placed in c1 1110 overlaps with the component placed at 0,0,0. In this case the bounding box radius of s1 905 is ~86,6. The centroid is also considered while calculating the backward offset. The backward offset is calculated for all the parts/instances that are still to be placed and the maximum of these values is considered the backward offset. The radius of c1 is the Maximum forward offset + Maximum backward offset, which is 173.2(=86.6 +86.6) in this example. The number of components that can be placed on c1 1110 is determined by the equation 360 degrees divided by the angle subtended at circle origin by two ends of a line having length equal to twice the bounding box radius of the first part to be added on the circle, which is 5 in this example. Once all the 5components are placed on this circle c1 1110. Next move to the next circle, c2 1115 to place the remaining 6instances of s2 910. The radius of c2 1115 equals the radius of c1 + maximum forward offset on c1 + maximum possible backward offset on c2, which is 311.7(=173.2+86.6 +51.96) in this example. The number of components that can be placed on this c2 1115 equals 360degrees divided by the angle subtended at circle origin by two ends of a line having length equal to twice the bounding box radius of the first part to be added on the circle, which is 18 in this example. Because only 6 more components need be placed, the remaining 12 places are empty.

Conclusion

From Step 1 through Step 5, the presently preferred embodiment has disclosed complete solution for radial component scattering. The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the presently preferred embodiment, such as other methods to place geometric objects into a windowed environment that does so with some intelligence like logically close components. Logically close components could be a nut and bolt, or a cable and pully or anything intended to be proximately placed to one another. Therefore, other implementations are within the scope of the following claims.

What is claimed is:

1. A computer-implemented method for radial component scattering, comprising:
    calculating a bounding box for each of a plurality of parts of an assembly by a computer system;
    calculating a centroid corresponding to each of said bounding boxes by the computer system;
    calculating a scatter circle for placement of said plurality of parts by the computer system; and
    calculating, by the computer system, a number of locations to place said plurality of parts on said scatter circle;
    whereby said plurality of parts of the assembly are added to an assembly view in a single operation such that a largest of said plurality of parts is at a start point.

2. The method of claim 1, wherein said scatter circle is calculated from a sum of a maximum forward offset and a maximum backward offset.

3. The method of claim 1, wherein said number of locations is determined by a length calculated from a bounding box radius.

4. The method of claim 1, wherein said length is a chord length.

5. The method of claim 1, wherein said number of locations is determined by dividing 360 degrees by an angle subtended from a center position by a chord length that is a value times a maximum bounding box radius.

6. The method of claim 5, wherein said value is two.

7. A computer-program product tangibly embodied in a machine readable medium to perform a method for component scattering, comprising instructions operable to cause a computer to:
- calculating a bounding box for each of a plurality of parts of an assembly;
- calculating a centroid corresponding to each of said bounding boxes;
- calculating a scatter circle for placement of said plurality of parts; and
- calculating a number of locations to place said plurality of parts on said scatter circle;
- whereby said plurality of parts of the assembly are added to an assembly view in a single operation such that a largest of said plurality of parts is at a start point.

8. The computer-program product of claim 7, wherein said scatter circle is calculated from a sum of a maximum forward offset and a maximum backward offset.

9. The computer-program product of claim 7, wherein said number of locations is determined by a length calculated from a bounding box radius.

10. The computer-program product of claim 7, wherein said length is a chord length.

11. The computer-program product of claim 7, wherein said number of locations is determined by dividing 360 degrees by an angle subtended from a center position by a chord length that is a value times a maximum bounding box radius.

12. The computer-program product of claim 11, wherein said value is two.

13. A data processing system comprising:
- a processor; and
- an accessible memory, the data processing configured to implement a method for component scattering by performing the actions of
- calculating a bounding box for each of a plurality of parts of an assembly;
- calculating a centroid corresponding to each of said bounding boxes;
- calculating a scatter circle for placement of said plurality of parts;
- calculating a number of locations to place said plurality of parts of the assembly on said scatter circle; and
- placing the plurality of parts of the assembly at the calculated locations in a single operation such that a largest of said plurality of parts is at a start point.

14. A computer implemented method for component scattering from a bill of material, comprising:
- selecting a plurality of components of a product from a list by a computer system;
- calculating a bounding box for each of said plurality of components by the computer system;
- calculating a centroid corresponding to each of said bounding boxes by the computer system;
- calculating a scatter circle for placement of said plurality of components by the computer system;
- calculating a number of locations to place said plurality of components of the product on said scatter circle; and
- displaying the plurality of components of the product by the computer system in an assembly view wherein a largest of said plurality of components of the product is displayed at a start point and the remaining components of the plurality of components of the product are displayed at the calculated locations on the scatter circle.

15. The method of claim 1, wherein said list is a bill of material.

16. A non-transitory machine readable medium encoded with executable instructions that, when executed, are operable to cause a computer to:
- select a plurality of components of a product from a list;
- calculate a bounding box for each of said plurality of components;
- calculate a centroid corresponding to each of said bounding boxes;
- calculate a scatter circle for placement of said plurality of components;
- calculate a number of locations to place said plurality of components of the product on said scatter circle; and
- display the plurality of components by the computer system in an assembly view wherein a largest of said plurality of components of the product is displayed at a start point and the remaining components of the plurality of components of the product are displayed at the calculated locations on the scatter circle.

17. The machine readable medium of claim 16, wherein said list is a bill of material.

18. A data processing system comprising:
- a processor; and
- an accessible memory, the data processing system configured to implement a method for component scattering from a bill of material by selecting a plurality of components of a product from a list;
- calculating a bounding box for each of said plurality of components;
- calculating a centroid corresponding to each of said bounding boxes;
- calculating a scatter circle for placement of said plurality of components;
- calculating a number of locations to place said plurality of components of the product on said scatter circle; and
- placing the plurality of components of the product at the calculated locations in a single operation such that a largest of said plurality of components is at a start point.

* * * * *

UNITED STATES PATENT AND TRADEMARK OFFICE
CERTIFICATE OF CORRECTION

| | | |
|---|---|---|
| PATENT NO. | : 8,264,501 B2 | Page 1 of 1 |
| APPLICATION NO. | : 12/051029 | |
| DATED | : September 11, 2012 | |
| INVENTOR(S) | : Fraser et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 961 days.

Signed and Sealed this
Twenty-sixth Day of August, 2014

Michelle K. Lee
*Deputy Director of the United States Patent and Trademark Office*